United States Patent [19]

Schwab et al.

[11] Patent Number: 5,144,315
[45] Date of Patent: Sep. 1, 1992

[54] SYSTEM FOR ACCURATELY MONITORING AIRCRAFT POSITION DURING TRAINING EXERCISES

[75] Inventors: Carl E. Schwab, Huntington Stat., N.Y.; Fred N. S. Goodrich, Barnstead, N.H.

[73] Assignee: Cardion, Inc., Woodbury, N.Y.

[21] Appl. No.: 625,040

[22] Filed: Dec. 10, 1990

Related U.S. Application Data

[63] Continuation-in-part of Ser. No. 537,000, Jun. 13, 1990, abandoned, which is a continuation of Ser. No. 308,594, Feb. 10, 1989, abandoned.

[51] Int. Cl.$^5$ .................. G01S 13/80; G01S 13/06
[52] U.S. Cl. .................. 342/49; 342/46; 342/169; 342/463
[58] Field of Search .......... 342/30, 36, 37, 43, 342/45, 46, 49, 59, 169, 399, 444, 453, 454, 463, 465

[56] References Cited

U.S. PATENT DOCUMENTS

| | | | |
|---|---|---|---|
| 3,706,992 | 12/1972 | Brisse et al. | 342/51 |
| 3,905,035 | 9/1975 | Krumboltz et al. | 342/14 |
| 3,950,753 | 4/1976 | Chisholm | 342/399 |
| 3,969,725 | 7/1976 | Couvillon et al. | 342/47 |
| 3,997,898 | 12/1976 | Le Grand | 342/35 |
| 4,010,465 | 3/1977 | Dodington et al. | 342/35 |
| 4,128,839 | 12/1978 | McComas | 342/32 |
| 4,143,376 | 3/1979 | Jezo | 342/49 X |
| 4,191,958 | 3/1980 | Hulland et al. | 342/396 |
| 4,385,300 | 5/1983 | Prill et al. | 342/399 |
| 4,532,516 | 7/1985 | Frampton et al. | 342/47 |
| 4,677,439 | 6/1987 | Skzypczak | 342/47 |
| 4,680,587 | 7/1987 | Chisholm | 342/33 |
| 4,688,046 | 8/1987 | Schwab | 342/456 |

Primary Examiner—John B. Sotomayor
Attorney, Agent, or Firm—Pollock, Vande Sande & Priddy

[57] ABSTRACT

Tracking system for monitoring aircraft position during simulated training exercises. Standard IFF transponders on the aircraft are periodically enabled by a squitter transmitter mounted on the aircraft. On the ground a plurality of receiving stations are interconnected through a communication link. The transponder replies are received at each receiving station. The time of arrival for each of the transponder replies is measured and communicated to one of the receiving stations. Using Loran techniques, accurate longitudinal and latitude coordinates are determined from the time of arrival data.

25 Claims, 4 Drawing Sheets

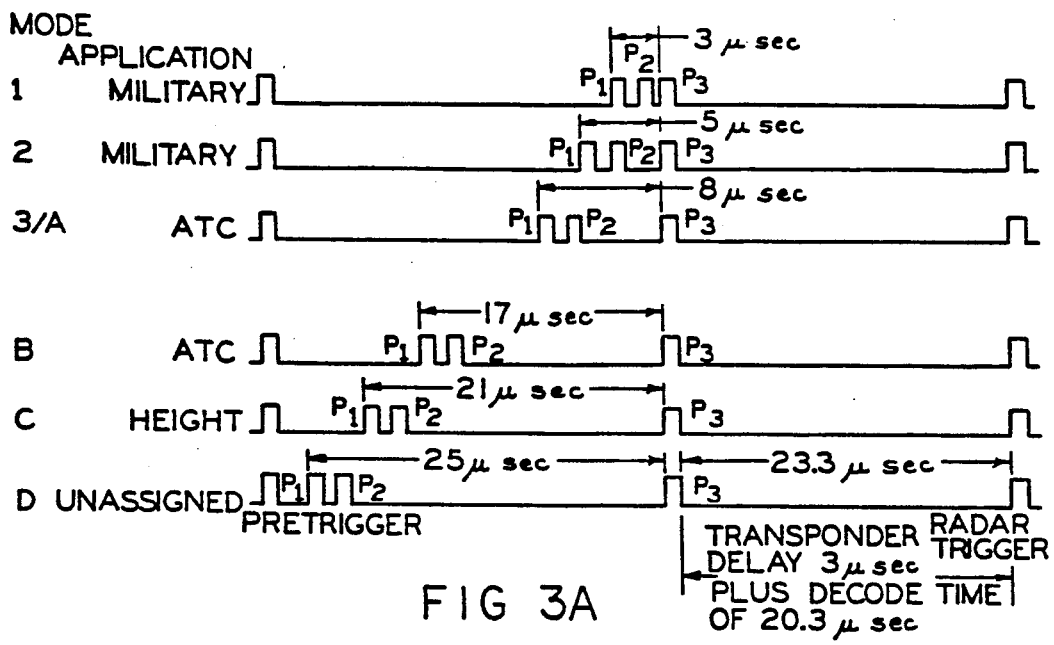
FIG 3A
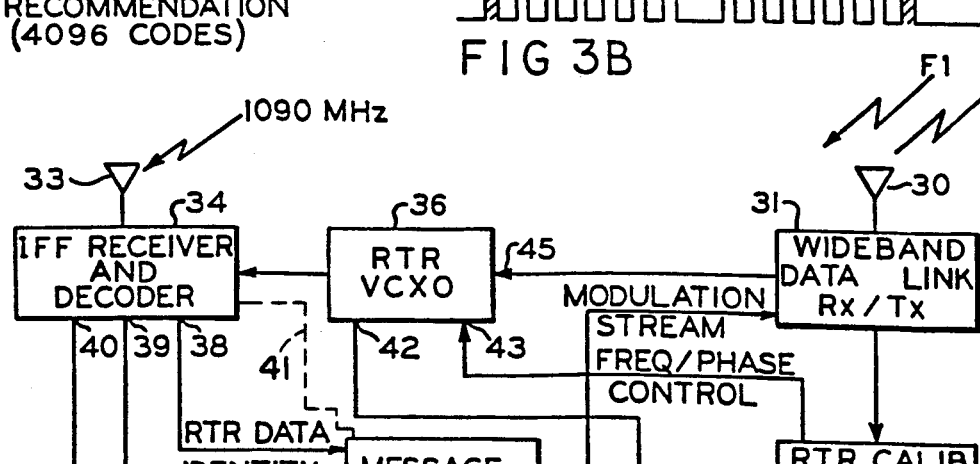
FIG 3B
FIG 4

SYSTEM FOR ACCURATELY MONITORING AIRCRAFT POSITION DURING TRAINING EXERCISES

CROSS-REFERENCE TO RELATED APPLICATIONS

This application is a continuation-in-part of 07/537,000 filed June 13, 1990 for SYSTEM FOR ACCURATELY MONITORING AIRCRAFT POSITION DURING TRAINING EXERCISES, now abandoned, which is a Rule 62 continuation of Ser. No. 308,594, filed Feb. 10, 1989 now abandoned.

BACKGROUND OF THE INVENTION

The present invention relates to systems for accurately monitoring the position of aircraft. Specifically, a system is provided for accurately determining the position of military aircraft during flight training over a test area which has simulated fire control radar installations.

Training of military pilots requires that the pilot know how to maneuver and react to defensive ground installations. These ground installations typically include ground to air missiles which are radar-guided. When a pilot encounters hostile territory, the aircraft will be illuminated with ground radar pulses. The pilot must be trained to effectively maneuver the aircraft to avoid the consequences, i.e., missiles which are fired in response to position information derived from these radar signals. The aircraft is equipped with electronic warfare equipment which identifies when the aircraft is being illuminated by such radar. The pilot must enter into an active jamming role and evasive maneuvering routine to avoid the consequences of such ground defense systems.

To effectively train combat pilots, training flights are conducted over training areas which include simulated missile defense systems. These simulated missile defense systems include radar beacons which simulate the fire control radar of missile defense systems.

In order to evaluate a pilot's performance under these training conditions, it is necessary to accurately monitor the aircraft's position as it proceeds through the test area. Presently, this position is obtained through precision ground based tracking radar, or cooperative electronic pods on the aircraft. During the training flight, the position of the aircraft is continuously monitored, and the performance of the pilot in carrying out evasive measures is monitored.

The radar tracking systems for position tracking of military aircraft over these training sites is expensive. Relocating the test site to provide different terrain in which a pilot is to train requires relocation of these sophisticated ground track radars. The expense and complications associated with re-establishing a new test site are avoided by a tracking system which is provided in accordance with this invention.

SUMMARY OF THE INVENTION

It is a primary object of this invention to provide a test site tracking system for monitoring the position of military aircraft.

It is a more specific object of this invention to provide the accurate position determination of military aircraft during a training exercise without burdening the aircraft with additional electronic equipment.

These and other objects are accomplished by a tracking system in accordance with the present invention.

The present invention makes use of conventional transponder equipment located on board the aircraft as a source of tracking data. Emissions from the aircraft transponder are used in an inverse Loran position determining system for establishing longitudinal and latitudinal coordinates for the aircraft. In the inverse Loran positioning system, a plurality of receiving stations are positioned around the test range. Aircraft flying through the test range include a squitter transmitter which will interrogate a conventional airborne IFF transponder to transmit its altitude and identity on a continuous basis to the ground receiving stations. The ground receiving stations have accurate clocks which are synchronized with each other. The synchronized receiving stations note the time of arrival of a transmission from the on-board transponder of the aircraft.

In the preferred embodiment of the invention, each of the receive stations are linked to a master receive station through a wide band data link. This two-way data link will permit the master station to calibrate the remote station clocks, as well as receive data emitted by the aircraft passing through the test site identifying the time of arrival of transponder transmissions to the receiving stations.

Using Loran techniques, the master can calculate X-Y coordinates for the aircraft from time of arrival information produced from each of the respective receive stations. Additionally, altitude information, which is transmitted as part of the reply of the IFF transponder, is available to constantly monitor the height of the aircraft.

Using the foregoing system, the aircraft need only include a small squitter transmitter for interrogating the standard IFF transponder on the aircraft. The squitter transmitter may be configured to interrogate the IFF transponder on an asynchronous basis, which reduces the possibility of collisions with replies from other aircraft transponders in the general vicinity.

In yet another embodiment of the invention, an accelerometer signal representing the aircraft performance, such as the changes in flight path being experienced by the aircraft, may be used to modify the squitter transmitter average interrogation rate. This change in average reply rate may be used by the ground receive stations and central station to accurately position ground tracking stations or illuminators in light of the changes.

In other embodiments of the invention, it is possible to cross-link the TACAN interrogating system on the aircraft with the IFF transponder. In this embodiment, the transmission of a TACAN pulse is used to initiate interrogation of the aircraft IFF transponder. Each of the receive locations receive not only the IFF reply containing altitude data, but the TACAN pulse. If each aircraft is previously assigned a TACAN frequency, the altitude and TACAN frequency may be correlated so that the identity of the aircraft is known.

The foregoing system permits configuration of a test site without requiring active radar, with precision positioning pedestals and communication systems for accurately monitoring the aircraft position.

DESCRIPTION OF THE FIGURES

FIG. 3A illustrates the interrogation modes available in standard IFF transponder equipment.

FIG. 3B illustrates transponder reply codes which are generated in response to interrogation pulses.

FIG. 4 illustrates the typical receiving station used to derive position information of aircraft during training maneuvers.

DESCRIPTION OF THE PREFERRED EMBODIMENT

Figure 1:
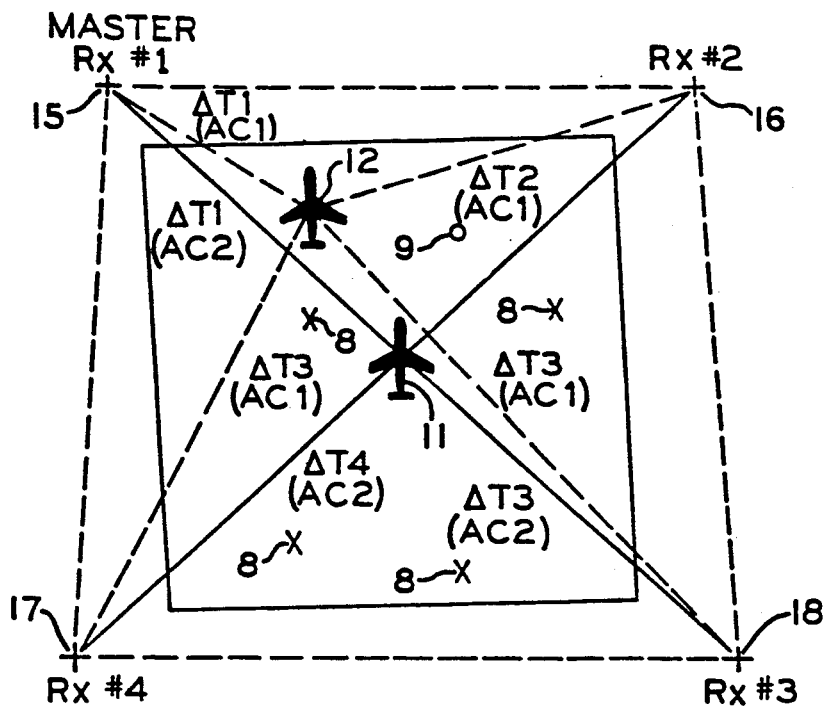
FIG. 1 illustrates a system layout for arranging a training site which accurately determines the position of aircraft during training in an electronic warfare environment.

Referring now to Figure there is shown an aircraft training site employing an embodiment of the present invention. The aircraft training site has boundaries which are identified by a quadrilateral, the corners of each quadrilateral including a receive station 15, 16, 17 and 18. One of the receive stations, 15, is a master station which, via a two-way communication link, collects data from the other receive stations.

During use, the training site will include several ground radar simulating sources 8. The aircraft 11, 12 will fly against the radar simulating beacons and exercise evasive maneuvers.

In carrying out such training exercises, it is necessary to accurately know the aircraft position during its flight through the training site.

The on-board transponder equipment, such as the conventional IFF transponders contained on military aircraft, as well as commercial aircraft, are constantly interrogated by a squitter transmitter, also fixed to the aircraft 11, 12. The interrogated transponder transmits the required reply containing altitude information and identification information of the aircraft.

Each of the receive stations 15, 16, 17 and 18 includes a local clock, synchronized with the master station 15 local clock. The time of arrival for the transponder transmissions are noted at each station, and transmitted to the master station 15 via a communication links. The time of arrival, as is known from conventional Loran principles, can be used from a minimum of three (3) stations to determine the location of the aircraft in longitude and latitude. Additional stations may be employed, giving redundancy and an increase in accuracy of position measurement.

Time of arrival information is used in other Loran type navigation systems. As explained in U.S. Pat. No. 4,688,046, two receiving stations can define a line of position for an aircraft based on a difference in time of arrival of a radio transmission from an aircraft. The position along the line can be identified by a third receiving station which permits the creation of a second line of position which intersects the first line of position.

The master station 15 includes a computer which will build a table of time of arrival measurements for each of the receive locations as the aircraft proceeds through the training site. The master station will determine the aircraft position for each instant of time the aircraft is over the training site. The IFF transponder transmits an altitude measurement as part of its reply to the interrogation pulse, as well as aircraft identity, so that the time of arrival information, for determining the longitude and latitude of the aircraft as well as altitude information is available for assessment of the training exercise.

In the preferred embodiment, a squitter transmitter is attached to the aircraft to interrogate the IFF transponder, which is conventionally provided on the aircraft, at periodic intervals. This makes use of the available IFF transponder without burdening the aircraft with additional hardware. The squitter transmitter is a small package which is fastened to the aircraft strut or weapon holder by conventional means.

Figure 2:
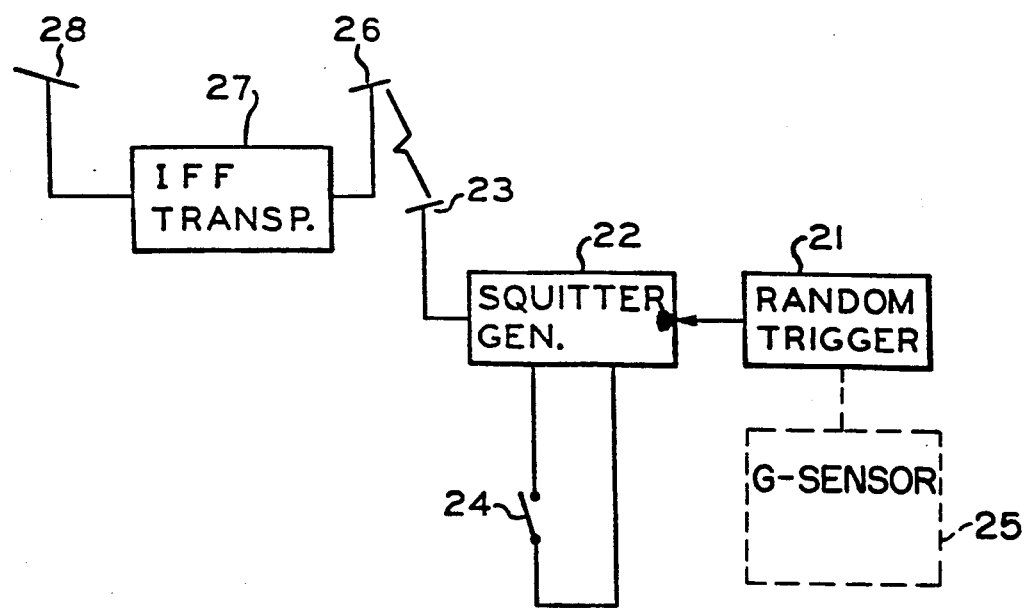
FIG. 2 illustrates on board aircraft equipment which enables an IFF transponder to serve as a radio beacon for tracking the aircraft.

Referring to FIG. 2, there is shown the equipment package carried by the aircraft for emitting standard IFF replies on a periodic basis. The squitter generator 22 will produce the standard interrogation pulses as shown in FIG. 3A on a random basis. Using a random trigger 21, the squitter generator 22 is enabled on a random basis. By randomizing the interrogation of the IFF transponder 27, the possibility of collisions with the replies from other aircraft in the vicinity of the one of interest can be avoided.

The squitter generator 22 includes a small antenna 23 for radiating to antenna 26 of the IFF transponder 27. The squitter generator 22 and random trigger 21 is conveniently mounted in an area of the aircraft, which would permit reliable interrogation of the IFF transponder 27. The squitter package may be conveniently mounted on an armament support which is provided on military aircraft. Power is conventionally supplied on these armament supports and is used to power the squitter generator 22 and random trigger 21 of FIG. 2.

As shown in FIG. 3A, the squitter package of FIG. 2 could emit mode C interrogation pulses so that the height of the aircraft would be repeatedly reported to the ground. The squitter package 21, 22 interrogate the transponder in accordance with modes A and C. Mode A will initiate interrogation pulses P1' P2 and P3 as shown in FIG. 3A.

This will initiate a transponder reply as shown in FIG. 3B, having a pulse pattern which defines the identity of the aircraft. Mode C interrogations follow 125 microseconds later which generate a transponder reply which contains data identifying the height of the aircraft. The spacing between the successive pairs of replies is nominally 50,000 microseconds, however, an internal time base generator is combined with the pseudorandom trigger generator 22 so that the actual period varies in a statistically random manner about the nominal period.

Triggering the transponder 27 in this way will reduce the likelihood of collisions on aircraft which are physically close to each other, and have randomly triggered transponder 27 transmissions.

The ground stations of FIG. 1 collect and correlate the received identity information from mode 3-a interrogation and height information from mode C interrogation. This data will be received in a constant 125 microsecond interval, making it easy for each of the ground stations to correlate the aircraft identity with its height.

The squitter generator 22 may include a disable switch 24 connected to the squitter generator 22. The disable switch 24 is enabled once the aircraft has returned to the ground, thus disabling squittering of the IFF transponder 27 until another training run commences. Switch 24 may be connected to the landing gear and operated when the aircraft is on the ground.

Further, the squitter transmitter may be keyed at a rate proportional to a signal from an accelerometer sensor mounted on the airframe, or within package 25. The average rate of interrogation pulses may increase as the aircraft experiences changes in flight path. The ground receiver can decode the rate of received replies and derive a signal representing changes in aircraft flight path.

The advantage of having the sensor 25 includes the provision of useful position information which can be used to position ground radar or ground based tracking systems. The interrogation pulse rate may be changed linearly with increases in acceleration. The accelerometer can be implemented to sense any of three directions of movement, lateral, pitch or yaw, with lateral motion sensing considered to be preferred. If the interrogate rate occurs at a nominal periodic rate of 50,000 microseconds, the accelerometer signal can increase this rate linearly. The ground receiving stations can decode this change in the nominal periodic rate to derive information relating to the aircraft flight path changes.

Additionally, the change in interrogation rate in response to acceleration will increase the total number of aircraft that can be simultaneously tracked. This results as some percentage of the aircraft are in a high acceleration condition, while most aircraft are in a normal G condition.

A block diagram of the remote receiving sites 16, 17 and 18 are shown in FIG. 4. FIG. 4 illustrates a wide band data link transmit/receive station 31 connected to an antenna 30 which is a microwave antenna, positioned to communicate with the master receive station 15. The wide band data link will permit synchronization of local clocks 36 at each of the remote receive locations with the master clock at the master station 15. Additionally, the recovered reply data from the IFF transponders and time of arrival information is transmitted back to the master station 15 over this wide band data link.

The replies from the IFF transponder 27 are received on antenna 33 at the conventional IFF reply frequency of 1090 MHz. The IFF receiver and decoder 34 will provide for three different quantities of data. The conventional identity and altitude data transmitted as part of the mode interrogation of the aircraft transponder 27 is decoded and supplied to output ports 39 and 40. The time of arrival of the altitude or identity information is computed for each transmission of the transponder reply. This time of arrival data appears on output port 38.

The time of arrival data is that time noted by the IFF receiver when the framing pulses of a reply are received. A counter within the IFF receiver 34, which is under control of real time clock 36, will note the occurrence of each pulse event received and will be cleared following the successful decode of both identity and altitude information. Thus, a time of arrival for the pulse train may be computed based on a running average of framing pulse arrivals or on the arrival of any of the identity or altitude data, as selected by the system designer.

An additional output port is shown which provides a signal representing the average periodic rate of time of arrival of the IFF reply. This will correspond to the signal produced by an accelerometer 41 on the aircraft. This signal may be used to obtain accurate position change information for the aircraft.

A message assembler 47 will compose the real time arrival data, identity data and altitude data and if available, the decoded accelerometer signal, into a message for modulating on the carrier signal of the wide band communication link. The wide band communication link station 31 will receive this modulation stream and transmit it to the master station 15.

In order for the master station to receive correlated time of arrival data for each of the receive locations, it is required that the real time clock 36 at each receive location be in synchronism. Thus, during a calibration sequence, the wide band data link will provide calibration data from the master station 15 used to synchronize each clock 36 at each receive location, so that during actual test runs, the time of arrival data from each receiver is synchronized with each other receiver.

A real time clock calibration and control network 49, to be described in greater detail, is used during a calibration interval to receive clock data from the wide band data link, decode the same and provide a frequency/phase control signal 43 to the real time clock 36. This frequency/phase control signal is the result of comparing the actual time of the real time clock 36 via output port 42 with a received real time from the master station 15. In this way, each of the real time receive clocks 36 can be synchronized.

Figure 5:
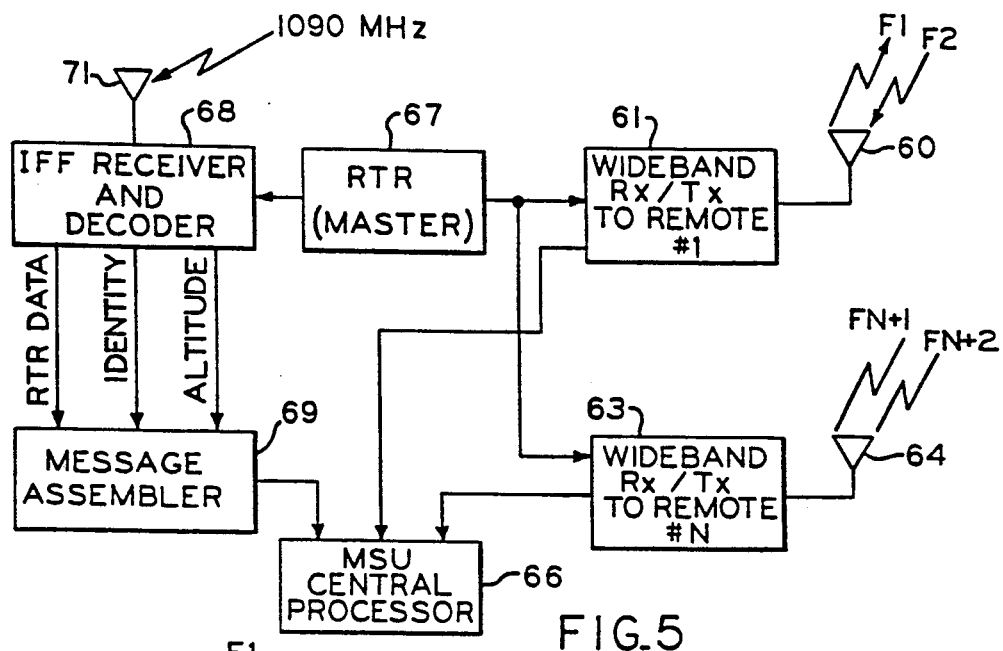
FIG. 5 is a block diagram of the master receive station for the training site.

The master receive station is shown in FIG. 5 which, is very similar to the remote receive stations of FIG. 4. An IFF receiver 68, connected to an IFF antenna 71, receives at the master location, both time of arrival data, and identity and altitude information from a transponder reply. The message assembler 69 arranges this message in a frame which can be delivered to a central processor 66.

Similar messages are received from each of three remote receive locations, via individual data links. A wide band data link comprising the transmit/receive station 61 is used to communicate with the first remote receive location. Additional data link stations 63 communicate with the remaining remote receive locations.

The central processor 66 can collect the assembled data package comprising altitude, and identify time of arrival data from each of the remote locations. If the squitter transmitter interrogation rate is varied in accordance with a sensor signal, this information is provided as well. The central processor 66 is a general purpose digital computer which includes a table for each receive station storing the most recent packet of received position and identity data from each receive location.

Thus, four tables can be built within the central processor 66 which will identify the identity and corresponding altitude and time of arrival data for each aircraft entering the training site. These tables can maintain time of arrival data for more than one aircraft since each time of arrival is correlated with each aircraft identity.

It is also possible to include a computer program which will calculate aircraft heading and ground speed from the position coordinates which are continuously calculated from time of arrival information. Thus, using change in position data both the related air speed and bearing may be calculated.

As those familiar with Loran technology will appreciate, latitude and longitude may be computed from time of arrival data obtained at three receive locations. The fourth time of arrival data can be used to permit a series of calculations to be accomplished between combinations of three receive stations. Any errors in data can be discarded in favor of the three most correlated computations for longitude and latitude position determination. Reporting of the position coordinates for aircraft in the training site can be sent by telephone link or displayed locally in an convenient manner.

The calibration of each of the receive locations requires only that the clocks at each receive location be synchronized. The RTR master clock 67 time can be transmitted to each of the receive locations over the data links represented by transmit/receive stations 61 through 63. It will be recognized that to achieve accurate synchronism between remotely located clocks and the master clock 67, calibration shall be required at each receive station to compensate for path delay experienced by transmission of clock information from the master station to each of the receive stations.

Figure 6:
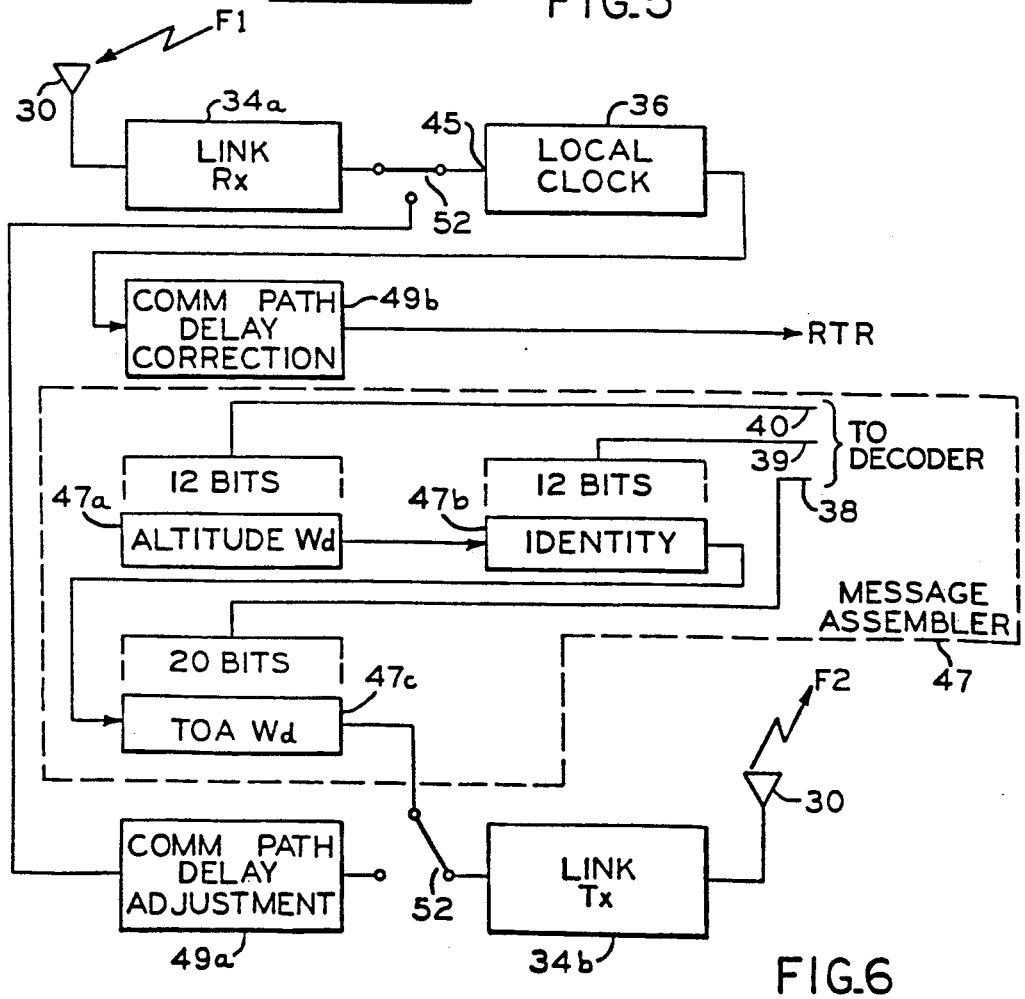
FIG. 6 illustrates in greater detail the arrangement of a receive location, message assembler and calibration equipment.

Referring now to FIG. 6, there is shown in greater detail how calibration of local clocks is effected at the remote receive locations which compensates for the path delay incurred over the communication links.

The receive portion of the data link station 34a is shown having an output which can be directly connected to the local clock 36 through an input 45 or to a path delay adjustment circuit 49a. Switch 52 can be controlled so that data identifying the clock frequency is transferred to the local clock 36 from the receive link 34a. Additionally, test signals sent over the receive link 34a may be routed via switch 52 through the path delay adjustment circuit 49a, through switch 52 back over the transmit link 34b portion of the station 34. During a calibration interval, the master station will transmit a tone over the wide band data link to the receive portion 34a of the remote data link station. The receive tone enters the path delay adjustment circuit 49a and through switch 52 is applied to the transmitter 34b of the wide band data link station. The communication path delay adjustment 49a and 49b are adjusted in tandem so that the path delay from the input of receiver 34a to the output of transmitter 34b shows no net phase shift to incoming and outgoing tones. With the path delay correction circuit 49b set to equal that of 49a, delays within the receive station are effectively compensated.

Thus, the retransmitted tone from transmitter 34b, when received at the master station, will include delays which are only from the data link path, principally resulting from the distance between receive and master station. At the master station, the incoming tones are measured with respect to the outgoing tone. Thus, an accurate measurement of the time delay between receive and transmit stations may be made. This quantity represents the two-way delay for the path length between master receive station and remote receive station. In transmitting a local clock time from the master station, this two-way delay is divided by two and a corrected local time is transmitted by the master to the receive local clock 36. At the remote stations, local clocks 36 are calibrated with a clock time corrected for path delay.

Each of the receive locations will have local clocks 36 calibrated so that the time of arrival of transponder replies will be loaded in a corresponding register 47c at each location. This time of arrival data may typically be as much as 20 bits wide and include the entire pair of replies, altitude and identity. The time of arrival may be measured against any of the reply bits which are in the register 47c.

The foregoing system makes use of transponder 27 which has previously been used on aircraft. Only the addition of a squitter generator 22 which can be conveniently mounted to a weapons carrying fixture on the aircraft.

As another technique for calibrating the receive clocks, a calibration transponder 9 may be located within the training area as is shown in FIG. 1. The transponder 9 is also operated in a squitter mode, preferably at a lower squitter rate such as 1 transmission per second, emitting both an identity and altitude transmission which is received by each receive station 15-18. The distances between each of the receive stations and the transponder 9 is precisely known. Each receive station will note the time of arrival using its internal receive clock just as it does when tracking aircraft through the sector. The time of arrival for these transmissions is reported to the master station. As the distances to each station are known, an expected time of arrival for each of these distances is also known. The master station computer will compare the expected time of arrival data with actual time of arrival data. The master station can compute clock offset corrections for each receive station real time clock, and modify subsequent time of arrival information received from a target aircraft. This calibration technique does not require an outgoing data link from the master station to each receive station. Additionally, this permits verification of the tracking system operation before in flight measurements begin.

As an alternative embodiment to the foregoing, it should be noted that many military aircraft include both IFF and TACAN navigation equipment. The TACAN transmitter on the aircraft will interrogate position location transponder on the ground. Rather than use a squitter transmitter, it is possible to initiate a mode C interrogation of the aircraft IFF transponder based on TACAN interrogation pulses.

Figure 7:
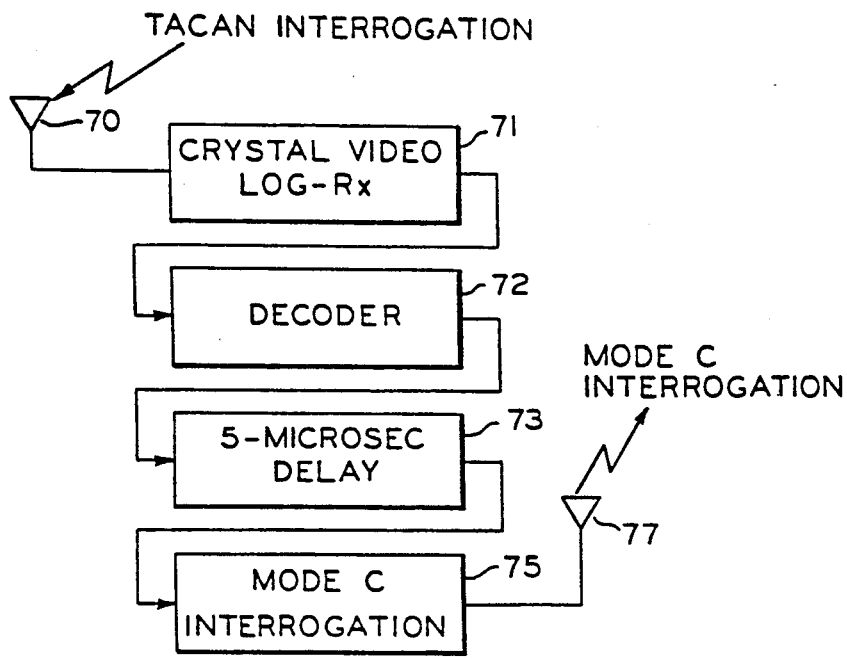
FIG. 7 illustrates aircraft equipment which uses the TACAN and IFF cross-linked transponder for use as a second embodiment of the invention.

In this embodiment, a cross-link circuit as shown in FIG. 7 may be employed, so that TACAN interrogations emitted by the aircraft are used to interrogate the IFF transponder.

A crystal detector 71 is shown connected to a small receiving antenna 70. TACAN interrogation pulses which are RF pulses of several hundred watt magnitude are received by the detector 71. The resulting pulse therefrom is decoded in decoder 72. A delayed pulse provided by delay circuit 73 is used to initiate a mode C interrogation from a transmitter 75. Rather than keying the transmitter on an asynchronous basis as was proposed in the earlier embodiment, mode C interrogation may be perfected in response to a TACAN pulse. The mode C interrogation is supplied through antenna 77 as in the previous embodiment to interrogate the IFF transponder.

Using the TACAN interrogation pulses to trigger a mode C interrogation provides for an ability to identify transponder replies to the mode C interrogation without requiring a mode 1, 2 or 3 interrogation of the IFF transmitter.

Figure 8:
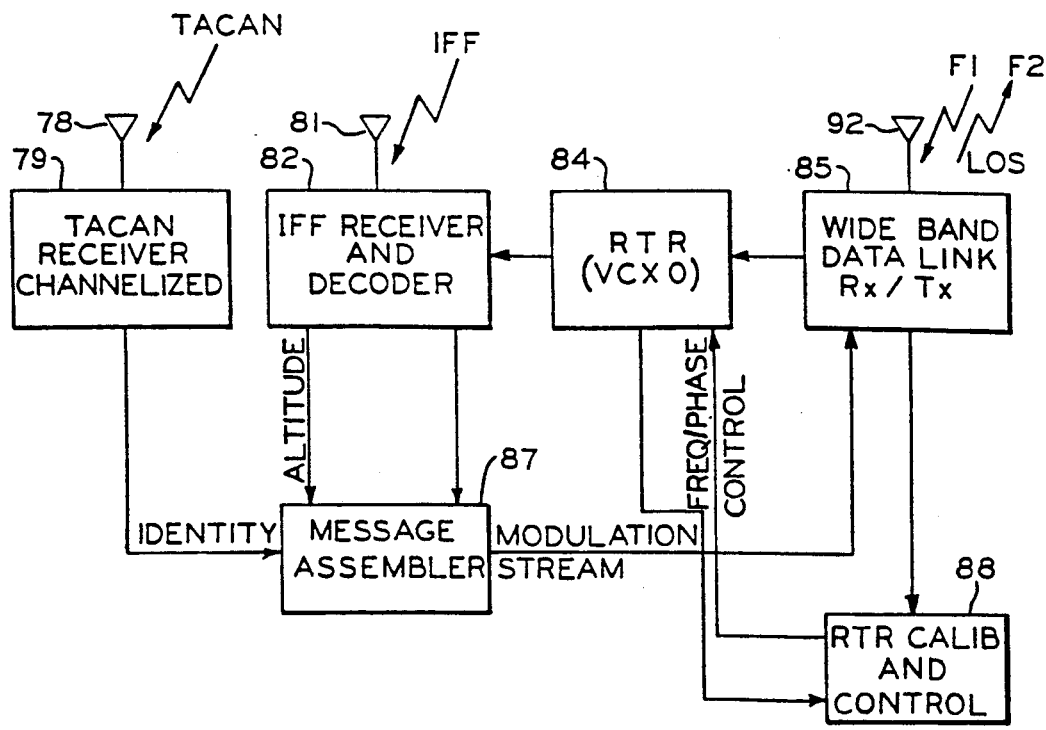
FIG. 8 illustrate the receive installation for a TACAN IFF cross-linked application.

As shown in FIG. 8, the remote sites can include a TACAN receiver as well as an IFF receiver and decoder. The particular channel of the TACAN receiver, which receives a TACAN inquiry correlated with an IFF reply received at the receiving location, can be used to identify the aircraft. Since the TACAN inquiry initiates the IFF reply, they are time correlated, permitting the remote receiving site to correlate altitude with identity.

At the remote receiving site, a TACAN antenna 78 supplies each received TACAN pulse to a TACN receiver 79. Depending on the frequency of the TACAN pulse, the aircraft is identified. Different aircraft will be preassigned a different TACAN frequency.

The IFF antenna 81 at the remote receive site is connected to the IFF receiver and decoder. The altitude and time of arrival information is once again compiled by a message assembler 87. The real time clock 84 is calibrated with the calibration and control circuitry 88 as wall described with respect to the previous embodiment. A wide band data link is provided by a data station 85. Calibration as well as modulated position data is transmitted via the wide band data link station 85 back to the master station.

Thus, in both embodiments it is possible to use existing IFF equipment and/or TACAN equipment to accurately locate an aircraft operating on a test site. Altitude, identity, longitudinal and lateral coordinates are known for the aircraft during the test in which the aircraft is steered through simulated fire control radar stations. The system permits this accurate location to be accomplished without burdening the aircraft with any additional equipment, other than a squitter transmitter of other means for interrogating the IFF transponder. However, this equipment overhead is minimal and may be conveniently carried on a weapons fixture on the aircraft.

Throughout the discussion of the previous embodiments, it was assumed that altitude information would be derived by the mode C relay from the IFF transponder aboard the aircraft. Those skilled in the art will recognize that if one of the receive stations is positioned in elevation higher than the remaining receive stations, it is possible to locate the altitude of the aircraft, using time of arrival methods. Thus, as a cross-check against altitude measurements from the IFF transponder, or as an independent calculation of altitude, the differences in height of each receive station permit only only longitudinal and latitudinal position coordinates to be derived but elevation coordinates as well.

The foregoing embodiment is exemplary only of a military training application for the invention. It is clear that the invention has applicability of other systems both military and non-military. An example of such other applications includes surveillance of airport geographical boundaries for the presence of unauthorized aircraft, as well as their longitude and latitude coordinates. Superior tracking and monitoring of these aircraft over conventional polar coordinate tracking systems is possible, permitting a higher degree of airport safety than is presently available.

There are many other embodiments which make use of the foregoing principles. These embodiments will be defined by the claims which follow.

What is claimed is:

1. A system for tracking an aircraft, equipped with an IFF transponder which emits a signal containing a data signal identifying the aircraft altitude during training exercises, comprising:
   a squitter transmitter mounted on said aircraft for interrogating said transponder whereby said data signal is transmitted;
   a plurality of ground receiving stations spaced apart over a test range;
   a communication link connecting said receiving stations; and,
   means at one of said receiving stations for receiving information from said other receiving stations over said communication link identifying the time of arrival of said transmitted data signal to each receiving station, and calculating from said time of arrivals the position of said aircraft.

2. The system for tracking aircraft of claim 1 wherein said means at said one receiving station calculates air speed and heading of said aircraft.

3. The system of claim 1 further including a plurality of spaced apart simulated ground radar signals against which said aircraft can conduct evasive maneuvers.

4. The system of claim 1 wherein said means at said one station is a digital computer.

5. The system for tracking of claim 1 wherein said communication link is two way between said one receiving station and said remaining receiving stations.

6. The system for tracking of claim 5 wherein said one receiving station distributes real time clock synchronization data over said communication link to said remaining receiving stations.

7. The system for tracking according to claim 1 further comprising a disabling switch coupled to said aircraft landing gear for disabling transmissions from said transponder when said aircraft is one the ground.

8. The system of claim 1 wherein said squitter transmitter is mounted to a weapon support on said aircraft.

9. The system of claim 1 wherein said squitter transmitter is enabled in response to a TACAN interrogation generator on said aircraft.

10. The system of claim 1 further comprising:
    a test transponder located at a known distance from each ground receiving station; and,
    means for triggering said test transponder into a transmission mode, whereby time of arrival information is received by said receiving stations and transmitted to said one receiving station for determining errors in time of arrival determinations made at each receiving station.

11. The system of claim 10 wherein said triggering means enables said test transponder at a rate of one transmission per second.

12. A system for tracking aircraft equipped with an IFF transponder and TACAN interrogation equipment during a training exercise comprising:
    a squitter transmitter supported on said aircraft for interrogating said IFF transponder;
    a circuit for enabling said squitter transmitter in response to each TACAN interrogation pulse produced by said TACAN interrogation equipment;
    a plurality of ground receiving stations positioned about a training site, said ground receiving stations including a receiver for receiving each TACAN interrogation pulse and IFF transponder reply, and correlating said TACAN pulse, IFF reply and aircraft identity, each receiving station measuring the time of arrival of said transponder replies, one of said plurality of ground receiving stations serving as a central station;
    a digital data link connecting said central ground receiving station to the remaining ground receiving stations, said data link transferring time of arrival information from said remaining receiving stations to said central station; and
    a central computer at said central station for receiving said time of arrival information, and calculating from said time of arrival information longitudinal and latitude position coordinates for said aircraft.

13. A system for tracking aircraft according to claim 12 comprising a message assembler at said remaining receiving stations for compiling a message including a measured time of arrival and a decoded altitude signal, said message assembler connected to transmit said message over said digital data link to said one station.

14. A system for tracking aircraft according to claim 13 wherein said circuit for enabling said squitter transmitter is responsive to a single TACAN pulse frequency assigned to said aircraft.

15. A system for tracking aircraft according to claim 14 wherein each ground station receiver is capable of receiving a plurality of TACAN pulse frequencies, and identifies each aircraft by a received TACAN pulse frequency.

16. A system for tracking aircraft according to claim 12 further comprising a landing gear operated switch for disabling said squitter transmitter when said aircraft is on the ground.

17. A system for tracking an aircraft, equipped with a transponder which initiates a standard replay unique to said aircraft in response to a radio frequency interrogation signal comprising:
  means located on said aircraft for selectively interrogating said transponder at intervals which varies about a nominal rate, whereby said standard reply unique to said aircraft is continuously transmitted;
  a plurality of ground receiving stations spaced apart over a test range for monitoring the performance of said aircraft, said ground receiving stations measuring the time of arrival of said replay to derive position information for said aircraft, as well as decoding said standard replay obtaining data unique to said aircraft;
  a communication link interconnecting said plurality of ground receiving stations for transmitting said time of arrival information and decoded replay data from said ground receiving stations to a central computer; and,
  a central computer for receiving said time of arrival information and replay data, and for computing said position information, and identifying said aircraft with said position information, tracking said aircraft as it enters an area defined by said ground receiving stations.

18. The system of claim 17 wherein said means for interrogating is a transmitter on said aircraft which produces a radio frequency signal for interrogating said transponder.

19. The system of claim 18 wherein said squitter transmitter produces a signal for interrogating said transponder in multiple modes.

20. The systems of claim 19, wherein one of said modes produces a reply from said transponder indicating the identity of said aircraft.

21. The system of claim 1 further comprising an accelerometer connected to said squitter transmitter for varying the rate of interrogation of said transmitter.

22. The system of claim further comprising means for generating a signal for varying the rate of interrogation of said squitter transmitter.

23. The system of claim 22 wherein said means for generating a signal produces a signal related to said aircraft performance.

24. The system of claim 17 further comprising means for generating a signal for varying said transponder interrogation rate in accordance with changes in said aircraft performance.

25. The system of claim 24 further comprising means for decoding at one of said ground receiving stations the average periodic rate at which said standard replies are received.

* * * * *

UNITED STATES PATENT AND TRADEMARK OFFICE
CERTIFICATE OF CORRECTION

PATENT NO. : 5,144,315

DATED : September 1, 1992

INVENTOR(S) : Carl E. Schwab et al

It is certified that error appears in the above-identified patent and that said Letters Patent is hereby corrected as shown below:

Column 12, line 14, claim 19, delete "squitter".

Signed and Sealed this

Twenty-first Day of September, 1993

Attest:

BRUCE LEHMAN

Attesting Officer            Commissioner of Patents and Trademarks